United States Patent [19]
Armstrong et al.

[11] 3,795,163
[45] Mar. 5, 1974

[54] METHOD OF SELECTIVELY CUTTING AND PERFORATING SUPERPOSED PANELS OF MATERIAL

[75] Inventors: William A. Armstrong, Elyria; James M. Stefancin, Parma, both of Ohio

[73] Assignee: The Dow Chemical Company, Midland, Mich.

[22] Filed: Dec. 16, 1971

[21] Appl. No.: 208,799

[52] U.S. Cl.............................. 83/30, 83/52, 83/338, 83/555, 83/678
[51] Int. Cl............................ B26f 1/24, B26d 3/00
[58] Field of Search....... 83/30, 39, 41, 49, 52, 554, 83/555, 338, 678, 695; 93/33

[56] References Cited
UNITED STATES PATENTS
353,555  11/1886  Goss et al. ............................ 83/338
465,427  12/1891  Cox..................................... 83/337
2,705,443  4/1955  Colby................................ 83/554 X Primary Examiner—Willie G. Abercrombie
Attorney, Agent, or Firm—Burke M. Halldorson

[57] ABSTRACT

The present invention discloses a method of perforating a first layer or panel of material, while selectively slitting a second layer underlying and in face to face contact with said first layer, and without requiring separation of said layers. Such a method is practiced using a saw-tooth blade which is pressed through both said layers, followed by stroking the blade to sever the underlying layer, while the upper layer is caused to slide with and accompanying the stroke of the blade, leaving the same intact, with with a line of perforations superposed with the aforesaid cut. The indicated method has utility particularly as regards fabricating certain end to end connected bag structures from continuous lengths of flattened tubular film.

20 Claims, 4 Drawing Figures

PATENTED MAR 5 1974  3,795,163

METHOD OF SELECTIVELY CUTTING AND PERFORATING SUPERPOSED PANELS OF MATERIAL

DISCUSSION OF THE PRIOR ART

When it is required to selectively perforate and/or cut the respective layers of continuous film tube stock, such as in forming a string of certain known bag structures therefrom, the prior art methods are normally based on the use of a "floating" mandrel which is carried internally within the film, and trapped in place, for example, by stationary nip rolls positioned both before and after the mandrel. The mandrel functions to separate the layers of the tubing such that the same can be selectively cut or perforated as demanded without disturbing the opposite layer. Understandably, methods based on this practice are far more complex and difficult than the usual cutting and perforating steps.

It is within the objectives of the present invention, however, to provide and disclose herein an improved method of selectively cutting and perforating opposed layers of material, without first requiring their separation, and in such a manner that the level of difficulty in performing said method, is not much above, if at all, that of cutting or perforating through a single layer of material.

It is yet a further objective of the present invention to apply the above method to the fabrication of end to end interconnected bag elements made from continuous lengths of flattened tubular film.

SUMMARY OF THE INVENTION

Briefly, then, the present invention contemplates a method of perforating a first layer of material, while slitting a second layer of material disposed in generally face-to-face contact with said first layer, the slit and perforation lines being superposed, and wherein said steps are performed selectively as to said layers, without requiring their separation. Said method is practiced by perforating said layers using a saw-tooth cutting blade or like instrument working firmly against a resilient, non-slip back-up surface or anvil, followed by the step of stroking the blade to slit the layer remote therefrom which is trapped against the anvil, and is thereby cut cleanly. The layer adjacent the blade, however, through lubrication or inherent high slip character as is present in many plastics, is caused to slide in the direction of said stroke, leaving the same intact but perforated. The method has utility particularly in forming end to end connected bags from flattened tubular film, such operations being performed at regular intervals, together with a formation of a heat seal adjacent each such interval. The resultant bag structure can be like that shown in FIGS. 2 and 3 of the drawing.

Reference is now taken to the drawings wherein.

DETAILED DESCRIPTION OF THE PREFERRED EMBODIMENTS

Figure 1:
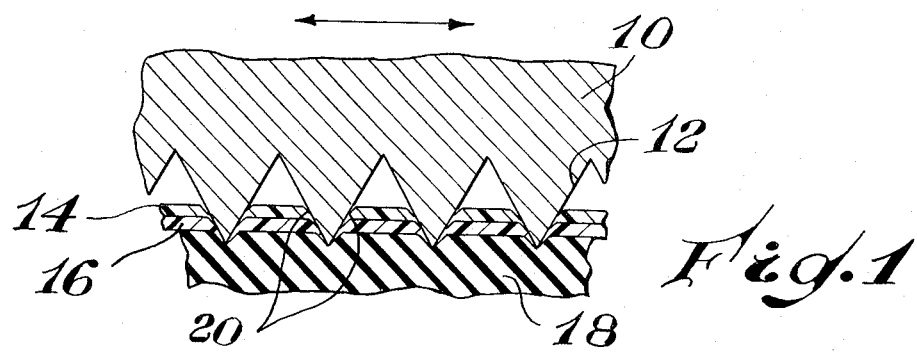
FIG. 1 is a cross-sectional view showing schematically the practice of the method of the present invention.

Referring now to a more detailed description of the drawings, the invention as shown in FIGS. 1 flatwise 2 employs a knife or blade 10 having a serrated or saw-tooth cutting edge 12, and which is used to serrate both plys or layers or panels 14 and 16, such as of flattened tubular film, against an anvil member 18 preferably of rubber. At the bottom of the serration stroke, the knife is then moved across the film in a sawing motion. Because the bottom ply 16 is trapped against the non or essentially non-slipping surface of the anvil, it does not slide appreciably and the saw teeth of the blade thus sever the bottom ply completely. The upper ply 14 of film is not trapped, however, or is at most trapped against the bottom ply 16, and owing to the normally slippery characteristics of plastic film, thus tends to slide relative to the bottom ply accompanying the cutting stroke of blade 10. Consequently, the upper ply is left perforated but intact, such perforations extending along a line superposed with the line of cut on the lower or bottom ply.

As a practical matter it has been found that a pure gum rubber of for example, about 40 shore durometer in hardness performs admirably as anvil member 18. The reference to the serrated edge or saw-tooth type blade refers to an instrument having an uneven cutting edge in which the projections or teeth thereof may be of regular size and spacing, or irregular, depending on the desired character of the perforation line. For example, the perforation line might consist of two long slits separated by a land; or as another example, a multiplicity of short slits, or combinations of long and short slits, as desired. The valleys between the aforesaid projection on blade 10 must be sufficiently deep or dull, or a combination thereof, so as not to cut through or completely sever the upper ply either on the downward stroke of the blade, or the aforesaid sawing stroke. Moreover, the portion of cutting edge 12 which engages the upper ply, such portion being denoted at areas 20 in FIG. 1, can be dulled, or relatively dull, to assist in the successful practice of this invention. In any event, satisfactory results have been experienced using a saw-tooth blade of relatively substantial cutting projections and thus consequently relatively deep valleys between such cutting projections.

As examples of materials useful in practicing the method of the present invention, polyethylene, saran, polystyrene, and like flexible films or sheet materials can be effectively perforated and cut along superposed lines by applying the general teachings herein. Polyethylene, depending of course on the specific formulation of such film, usually exhibits sufficient slip, or slippery surface characteristics, to be of special interest as to the aforesaid method, and is also a standard packaging film which merits its specific attention in this disclosure. However, as is readily understood, the invention is applicable to most any plastic having relatively high-slip surface quality. Of course, to the extent the invention is satisfactory as to any particular film, or specific formulation of such film, the same is expediently determined by trial and error procedure. To the extent the invention may not be satisfactory as to any particular material because of insufficient slip at the interface between plys 14 and 16, the practice of the invention can be assisted by anti-block agents or lubricants, either dry or liquid, as may be compatible to said specific material, thus expanding the invention to a broad range of materials beyond plastics, as for example, paper or paper products, laminates including plastics as well as other material and the like. Particularly as to saran, oftentimes dry lubricants or anti-block agents such as powdered starch, talc, mica or the like will be found beneficial to the practice of this invention when used as a coating at the interface between plys 14 and 16. An alternate approach applicable for many plastic films, would be to incorporate slip additives or additional slip additives in their formulations, thereby tailoring such films to the practice of the teachings herein.

Figure 2:
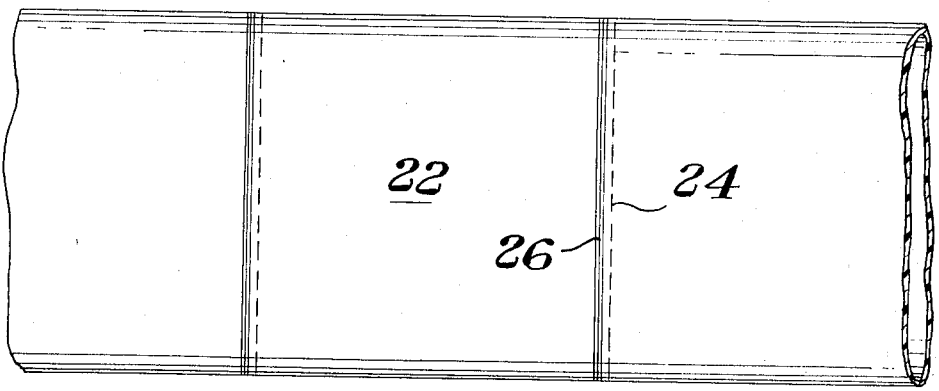
FIG. 2 is a top view illustrating a chain of end-wise connected bag elements which may be constructed utilizing the method of the present invention.

Referring now to FIG. 2, it is contemplated that the invention herein be particularly applied to the fabrication of end-wise interconnected bag elements, such as of the variety or structure of bags as indicated at Reference Numeral 22. The material for such bags would customarily be polyethylene film tubing. Such tubing is perforated and cut at regularly spaced intervals through practice of the method described above, the serration or perforation line 24 being visible and located on the upper ply of the tubing, and extending across the width thereof at each such interval. A complete or essentially complete severing of the bottom ply across the width of the tubing is also simultaneously affected by said method and each such cut is superposed directly under the respective perforation lines, and therefore is not visible in FIG. 2. The method of forming bags 22 further contemplates the formation of cross-seal areas, as indicated by seal line 26, and which also may extend across the tubing width.

Figure 3:
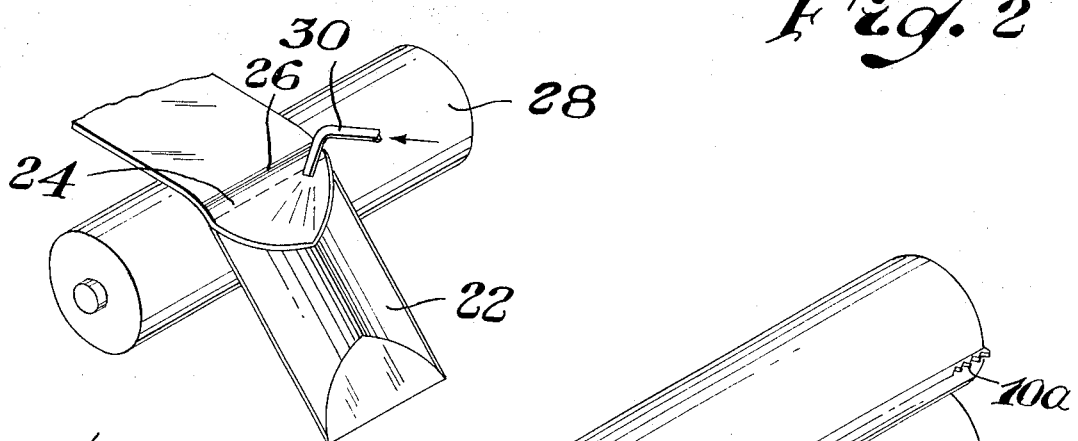
FIG. 3 is an isometric view illustrating in somewhat abbreviated form, one method of utilizing the bag elements of FIG. 2.

The resultant bag structure is frequently referred to as a "Kangaroo" bag structure for reason as particularly well exemplified in FIG. 3. The bags 22, for example, can be fed as a continuous chain horizontally to roll means or the like 28, and then vertically downwardly about the roll means. The chain is so oriented that the cut or severed ply faces upwardly from the roll means, and thus the perforated ply faces downwardly or against the roll. As the bags proceed over the roll a jet of air such as from a nozzle 30, catches the severed edge of the bag thus inflating the bag and giving it the illusion of a "Kangaroo" pouch. The bag is thus made ready to be conveniently filled, and at any time after filling can be detached from the chain along the aforenoted lines of perforation.

Figure 4:
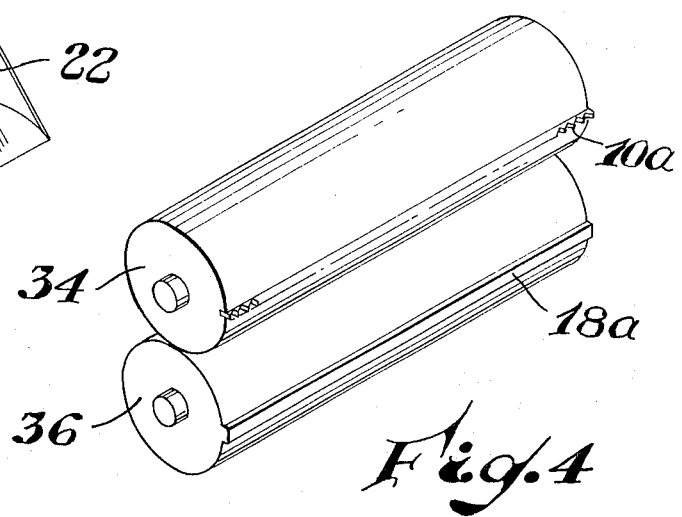
FIG. 4 is a view like FIG. 3 showing in abbreviated form, a type of equipment contemplated for automatically practicing the cutting and serrating method of this invention.

FIG. 4 shows a brief form of apparatus 32 designed for practicing this invention on an automatic basis. Such apparatus can include opposed rolls 34 and 36. The roll 34 carries a serrated edged cutting blade 10a (only a portion of the serrated edge being shown), adapted to cooperate with an anvil or pad 18a carried on the opposite roll 36. The blade 10a can be carried slidably by groove means or the like so that through caming, in cooperation with spring loading for example, or reverse caming (not shown), the blade is stroked and returned in proper synchronization with its contact with pad 18a, whereby the method of this invention is performed automatically, it being understood of course, that the material is to be fed between rolls 34 and 36 for this purpose. More specifically, the blade 10a can be stroked in one direction to form the cut and perforation line at one interval, and then reversely stroked or returned in the next interval to form the next succeeding cut and perforation line; or the blade can be stroked and returned with each interval.

As is clearly apparent any variety of bag structures can be fabricated according to the method of the present invention depending of course on the need for superposed perforation and cut lines in the structure of such bags. Moreover such bags can be constructed employing flexible tubular material as described, or alternately superposed panels of flexible material such as V-folded web stock; and can be gussetted as for example, in the manner taught in U.S. Pat. No. 3,027,065. Further, multiple layers such as three or four layers can be serrated and cut simultaneously utilizing the principles of the teachings herein contained. Whether such layers are cut or serrated depends of course on which layers remain stationary, and which are permitted to slip accompanying the stroke of the blade, and can be regulated through material selections, blade pressure, character of anvil 18, the use of applicable lubrication or anti-block agents, speed of the stroke of the blade, the character of its cutting edge, and so forth.

The line of the perforations and cut may be straight as shown in FIG. 3, or curved such as through use of a curved blade that is stroked in an arc along an arched path. Further it is clear that rather than completely severing one layer while perforating the other, the line of severance could be partial, and could include lands between slit lines, for example in which latter case the line of severance would resemble a line of perforations, but of different character than the line of perforations superposed therewith. This latter variation of the invention is made readily possible through controlling the length of the stroke of the blade, together with the design thereof.

Accordingly, while certain representative embodiments and details have been shown for purpose of illustrating the invention, it is apparent to those skilled in the art that various changes and modifications can be made therein without departing from the spirit and scope of the invention.

What is claimed is:

1. In a method for forming a line of perforations on a first panel of flexible material, while selectively cutting a second panel of like material along a line superposed with said perforation line, the steps of:

i. positioning a plurality of panels comprising at least said first and second second panels in generally faltwise superposed relationship against an anvil surface means, said second panel being in contacting association with the anvil surface means, ii. piercing through the panels from the opposite side using a plurality of cutting projections, and to an extent so that said cutting projections are placed in cutting association with said second panel, and in firm pressing engagement against said anvil surface means, said cutting projections being spaced apart along a linear path to form a line of perforations in said first panel comprising at least two perforations, iii. while in the resultant position of step (ii), stroking said cutting projections at least partially across said anvil surface means and substantially in the direction defined by said linear path, said stroking step being effected by moving the anvil surface means or said cutting projections, iv. promoting sufficient grip between the second panel and the anvil surface means along the contacting interface portions thereof to restrain relative movement therebetween to the extent necessary to selectively cut the second panel along said linear path accompanying said stroking step; and v. promoting sufficient slip at an interface located intermediate said first panel and said gripping interface to obtain slippage along said intermediate interface to the extent necessary to substantially preserve the character of said line of perforations accompanying the selective cutting of the second panel.

2. The method of claim 1 wherein step (ii) comprises piercing all said panels including said second panel using said cutting projections.

3. The method of claim 2 wherein step (iv) comprises promoting said grip by means of friction and/or blocking engagement of the second panel with the anvil surface means.

4. The method of claim 2 wherein step (v) comprises promoting said slippage by means of the selection of the material of at least one of the panels defining said intermediate interface.

5. The method of claim 2 wherein step (v) comprises promoting said slippage by applying a slip inducing substance to at least one of the panel faces defining said intermediate interface.

6. The method of claim 2 wherein said linear path is straight.

7. The method of claim 2 wherein said linear path is curved.

8. The method of claim 2 wherein said first and second panels comprise the opposite layers of continuous flattened tubular material.

9. The method of claim 8 wherein the perforation and cut lines extend substantially across the width of said tubing and wherein steps (i) through (v) above are performed at regular intervals on said tubing together with the step of forming a seal adjacent each such interval to transform said tubing into end to end connected bag elements.

10. The method of claim 2 wherein said panels comprise synthetic resinous thermoplastic film material.

11. In a method for forming distinctive cut lines selectively on first and second panels of material, such cut lines being superposed with each other, the steps of:

i. positioning a plurality of panels comprising at least said first and second panels in generally flatwise superposed relationship against an anvil surface means, said second panel being in contacting association with the anvil surface means;

ii. piercing through said panels from the opposite side using at least one cutting means, and to an extent so that said cutting means is placed in cutting association with the second panel and in pressing engagement with said anvil surface means, and whereby an aperture is formed at least in said first panel, said aperture leaving a region of said first panel intact, said intact region being overlapped with the second panel.

iii. while in the resultant position of step (ii), stroking said cutting projection at least partially across said anvil surface means and in a direction traversing said intact region, said stroking step being effected by moving the anvil surface means or said cutting projection;

iv. promoting sufficient grip between the second panel and the anvil surface means along the contacting interface portions thereof to restrain relative movement therebetween to selectively cut the second panel through said stroking step; and v. promoting sufficient slip at an interface located intermediate said first panel and the gripping interface to obtain slippage along said intermediate interface to the extent necessary to substantially preserve the character of said aperture accompanying the selective cutting of the second panel.

12. The method of claim 11 wherein step (iv) comprises promoting said grip by means of friction and/or blocking engagement of the second panel with the anvil surface means.

13. The method of claim 11 wherein step (v) comprises promoting said slippage by means of the selection of the material of at least one of the panels defining said intermediate interface.

14. The method of claim 11 wherein step (v) comprises promoting said slippage by applying a slip inducing substance to at least one of the panel faces defining said intermediate interface.

15. The method of claim 11 wherein step (ii) comprises piercing said panels using a plurality of cutting means spaced apart from each other along a linear path, whereby a line of apertures is formed at least in said first panel, said apertures being separated by intact regions and wherein step (iii) comprises stroking said cutting projections in a direction aligned with said linear path.

16. The method of claim 15 wherein all said panels including said second panel are pierced in practicing step (ii).

17. The method of claim 15 wherein said first and second panels comprise the layers of flattened continuous tubing of synthetic resinous thermoplastic film material.

18. The method of claim 17 wherein the aperture and cut lines extend substantially across the width of said tubing and wherein steps (i) through (v) above are performed at regular intervals on said tubing together with the step of forming a seal adjacent each such interval to transform said tubing into end to end connected bag elements.

19. The method of claim 17 wherein said linear path is curved.

20. The method of claim 17 wherein said linear path is straight.

* * * * *